Figure 1:
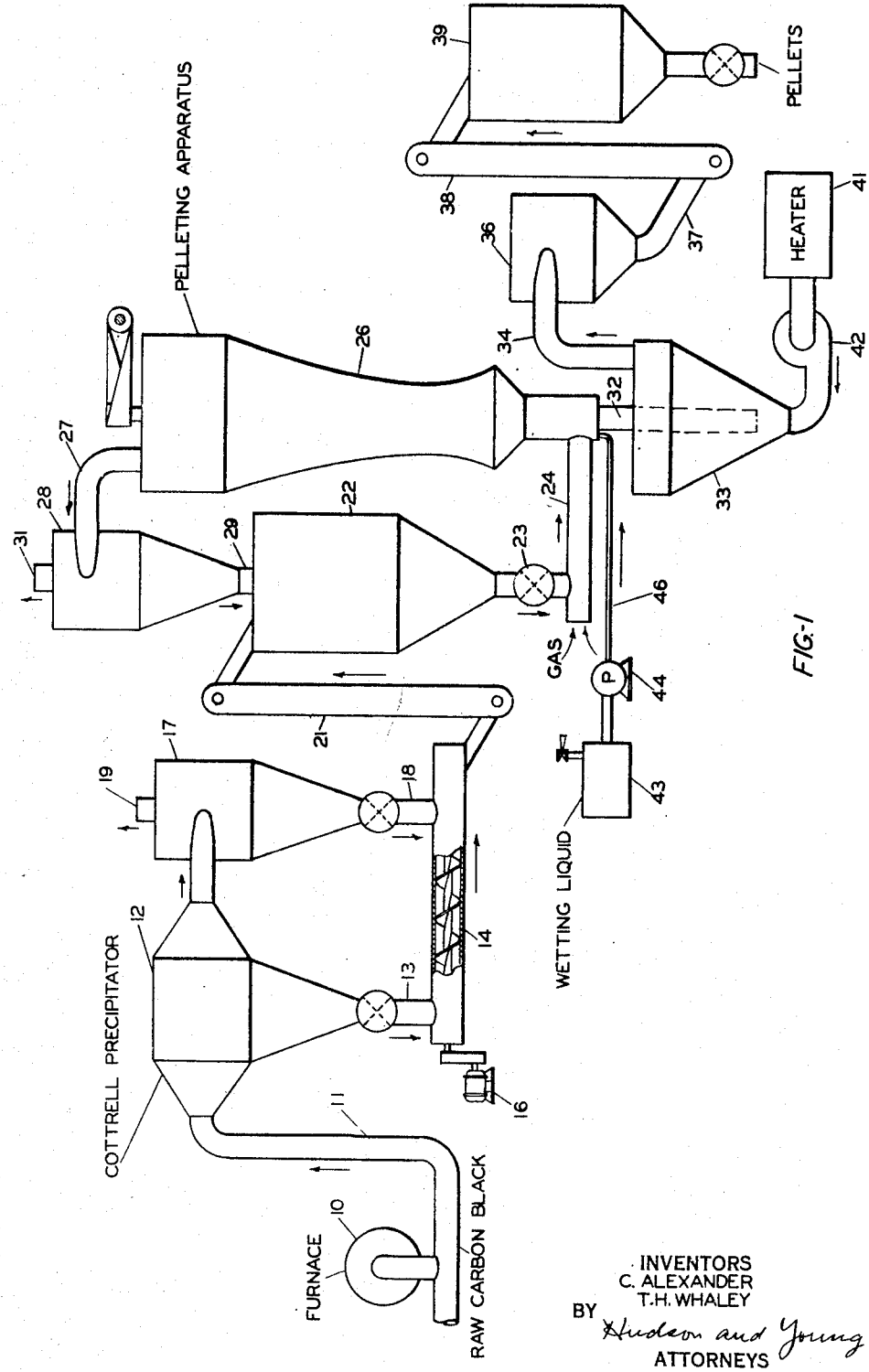

July 20, 1954

C. ALEXANDER ET AL 2,684,290

AGGLOMERATING PROCESS AND APPARATUS

Original Filed April 14, 1945

3 Sheets-Sheet 1

INVENTORS
C. ALEXANDER
T. H. WHALEY
BY Hudson and Young
ATTORNEYS

July 20, 1954  C. ALEXANDER ET AL  2,684,290
AGGLOMERATING PROCESS AND APPARATUS
Original Filed April 14, 1945  3 Sheets-Sheet 3

INVENTORS
C. ALEXANDER
T. H. WHALEY
BY
Hudson and Young
ATTORNEYS

Patented July 20, 1954

2,684,290

UNITED STATES PATENT OFFICE 2,684,290

AGGLOMERATING PROCESS AND APPARATUS

Cruzan Alexander and Thomas H. Whaley, Bartlesville, Okla., assignors to Phillips Petroleum Company, a corporation of Delaware Original application April 14, 1945, Serial No. 588,372. Divided and this application December 4, 1950, Serial No. 198,986

12 Claims. (Cl. 23—314)

This invention relates to the agglomeration of powdered material. In one particular embodiment this invention relates to a method and apparatus for pelleting carbon black to be used in compounding rubber. In a particular aspect this invention relates to the pelleting of carbon black and the classification and drying of the pellets. This application is a division of our copending application Serial No. 588,372, filed April 14, 1945, for "Agglomerating Apparatus," now Patent No. 2,548,332.

In the compounding of rubber for many uses, carbon black is an essential ingredient which is admixed as a filler with crude, natural, or synthetic rubber to improve the quality of the final product. By one method, carbon black is produced by burning natural gas with insufficient oxygen in small burners. A cool metal beam is passed continuously over the flame of gas to cool and collect the carbon particles. The carbon particles are scraped from this beam and recovered as a fine flocculent powder. This type of carbon black is commonly called "channel black" because of the use of the steel channel beam to collect the carbon. Another method of making carbon black, often called "furnace black" when made by this method, involves the introduction of gas or oil into a heated furnace to thermally decompose the gas or oil to carbon and other decomposition products.

The so-called channel black is considered hard and highly abrasive-resistant, but this type of black is used more frequently for the compounding of natural rubber rather than for synthetic rubber. On the other hand furnace black is soft and may be used effectively in the compounding of both synthetic and natural rubber.

Throughout this specification the term rubber is used in its broadest sense and includes vulcanizable natural hydrocarbon gums and polymers or copolymers of polymerizable organic compouinds; the former is generally designated as natural rubber while the latter is known as synthetic rubber. As applied in the art, the term synthetic rubber includes the polymerization products of olefins, diolefins, styrene and its derivatives, alkyl esters of acrylic and alkacrylic acid, such as methyl methacrylate, and other organic compounds having at least one active vinyl group (—C=C—). These compounds are polymerized alone or in admixture with one another.

Certain characteristics of carbon black, such as its binding and wear-resistance qualities, render it particularly valuable in the manufacture of rubber products in which it is incorporated. To fully realize these characteristics of the carbon black, the incorporation into the rubber necessitates the proper handling and dispersion of the fine carbon particles in the rubber. Carbon black, as manufactured, is such a fine and flocculent powder that it is extremely hard to handle and ship in that form. Thus, uniform mixing of the flocculent carbon into the rubber products to produce a homogeneous mixture is practically impossible unless some means is provided for handling and dispersing the material. To alleviate these difficulties, it was found that the use of carbon black in the form of more or less compact pellets or brickettes would accomplish that purpose adequately without materially changing the essential properties of the carbon black.

Throughout this specification, the term "pelleting" is used to designate the agglomeration of powdered material into larger particles, regardless of the process by which the agglomeration is effected or the nature of the particle produced. The term "pellet" is used to designate the agglomerate particle.

Pelleting of carbon black has been accomplished by admixing the carbon black with a wetting agent or liquid to form a paste and extruding the paste through dies. The extruded paste is dried and broken into segments. Another method involves wetting a portion of the carbon black particles while subjecting them to agitation. The wetting agents which have been used include water, gasoline, kerosene, naphtha, and tar with a suitable solvent. Pellets formed by either of these two methods are subjected to a drying operation prior to packaging or shipping. The raw unpelleted carbon black has a density of about 3 pounds per cubic foot and this density can be increased to as high as almost 25 pounds per cubic foot, after drying, by either of the two methods mentioned above. The increase in the density to about 25 pounds per cubic foot greatly facilitates both handling and shipping of the carbon black.

These previously known processes of pelleting carbon black, however, often tend to produce a relatively hard and dusty particle with great irregularity in size and density. In some cases because of the wetting agent used and because of inadequate control during mixing and pelleting, the carbon black itself is somewhat altered in its characteristics so as to make the pelleted material inferior in chemical quality. Thus, it is greatly to be desired to provide a continuous method of pelleting to produce a dustless carbon black pellet which is relatively soft and capable of being easily broken into a fine powder when incorporated in the final rubber product, yet which is capable of retaining its shape and compactness during handling. It is also desirable to provide a process which will consistently produce carbon black pellets of superior chemical quality for use in compounding both natural and synthetic rubber.

An object of this invention is to provide a continuous process for the pelleting of flocculent powdered material.

Another object is to provide improved apparatus for the pelleting of carbon black and similar flocculent powders.

Another object is to form uniform size carbon black pellets from flocculent carbon black and a suitable wetting agent.

Still another object is to provide a means of drying and classifying carbon black pellets.

Still a further object is to produce a dustless pellet of a solid material which, in its unpelleted form, is a flocculent powder, said pellet being capable of being readily broken into a fine powder.

Another object is to produce a dustless carbon black pellet capable of being easily broken into a fine powder when incorporated in coagulated rubber in the compounding of rubber products.

It is another object to provide a means for proportioning the amount of carbon black and wetting agent which compose carbon black pellets.

Other objects and advantages will become apparent to those skilled in the art from the accompanying drawing and disclosure.

The present invention provides a process for the pelleting of finely powdered materials to form pellets of substantially uniform size and density, of a dustless character, and having the quality of being readily dispersed in rubber. The present invention is not limited to pelleting of carbon black, but it may be used for pelleting of other fine powders, such as talc, zinc oxide, iron oxide, etc.

In accordance with one embodiment of this invention and its application to the pelleting of carbon black, dustless carbon black pellets of superior physical and chemical qualities can be produced by suspending carbon black in air or other gas, such as an inert normally gaseous hydrocarbon, nitrogen, carbon dioxide, etc., and passing flocculent carbon black thus suspended through a fine spray or mist of a wetting liquid to form small droplets or particles of carbon black having wetted nuclei. These particles or droplets of carbon black and liquid which are suspended in the gas pass directly into a vertical beating or agitating column where the particles are vigorously agitated, as by rods or chains or the like revolving about a vertical shaft within the column. In this embodiment, the beating apparatus comprises a conical column which has a decreasing cross sectional area from top to bottom of the column so that, in a case where the gas and incoming carbon black are introduced into the lower portion of the column, each droplet is carried upward until a level is reached at which the upward velocity of the gas is just sufficient to counter-balance the weight of the particle. These suspended droplets are subjected to agitation or beating, as by the revolving rods, or the like, within the column. The agitation of the droplets causes them to pack and to form larger particles by combination. As the particles become larger and more dense they fall countercurrently to the upward flowing carbon black wetting-liquid droplets and gas to a zone where the gas velocity is sufficient to maintain them in suspension, and they are finally removed from the lower portion of the column as a pellet of the desired size and density.

The method and apparatus, described herein, for pelleting flocculent powders in the presence of a wetting liquid is equally applicable to the pelleting of such flocculent powders without the use of a wetting liquid. The flocculent powder is passed into the lower portion of the agitating zone or column without wetting the powder with a liquid. Gas and unpelleted powder is passed out the upper portion of the agitating column. A suitable pellet of the desired size and density, which is formed by the agitation, is removed from the lower portion of the agitating column in a manner similar to the case of wet pelleting. The size and density of the pellets produced without a wetting liquid are somewhat less than the size and density of pellets produced with a wetting liquid; however, in some cases it may be desirable to have a smaller pellet with less density than those pellets produced with a wetting liquid.

Natural or synthetic rubber latex is preferred as the wetting liquid used in accordance with this invention, however, many other wetting liquids such as gasoline, water, etc., may be used without departing from the scope of this invention. The amount of wetting liquid used to effect pelleting in the apparatus is variable, it being generally desirable to use an amount sufficient to wet a limited portion of the carbon black to form nuclei of carbon black and wetting liquid (droplets) around which nuclei pellets are later formed. A part of the excess carbon black supplied adheres to the nuclei to form unfinished pellets or droplets. The quantity of wetting liquid used may be varied over rather wide limits. In general, it is preferable to use from about 0.5 to about 1.5 parts wetting liquid by weight per part of carbon black. About 1.5 parts liquid by weight per part of carbon black represents the upper limit in this apparatus. The droplets as produced by the mixing of the flocculent carbon black and wetting liquid are not tacky or adhesive because of the coating of relatively dry carbon black on the surface. These unfinished pellets or droplets are then conveyed to the agitating column for densification and classification.

The cross-sectional area of the upper portion of the column is so selected, in proportion to the amount of gas moving upward at this point, as to provide a certain upward velocity, which is insufficient to carry away any unfinished pellet or droplet of the wetted carbon black but sufficient to carry away the excess flocculent carbon black. The cross-section of the lower portion of the column is so selected with regard to the velocity of the gas at this point to permit only finished pellets of the desired size and density to fall out of the agitating zone or column itself. In this way each pellet is cause to remain in the agitating zone for whatever length of time may be necessary to obtain a pellet of the desired size and density. Excess carbon black and gas are removed from the top of the column and may be recycled to the process, if desired. Dustless carbon black pellets, having more or less a uniform size, are removed from the lower portion of the column for subsequent drying and packing.

After removal from the agitating zone or column, the finished pellets are preferably dried, and as a part of a specific embodiment of this invention, the pellets pass into the small cross-sectional end of a conical or tapered column. This column is constructed very similarly to and is operated in a manner similar to the agitating or beating column heretofore described. A suitable drying gas, such as air, carbon dioxide, etc., and carbon black pellets are introduced into the lower end of the column where the velocity of the gas is sufficient to maintain the pellets suspended at this point. As the pellets dry they rise through the column due to their decrease in density by the evaporation of liquid therefrom until they are fully dried, when and after being dried they are discharged from the upper portion of the column. The cross-sectional area of the upper portion of the column is so selected with regard to the gas velocity that only the substantially dry finished pellets will be carried out of the column. The dried dustless pellets are then packed for shipping or are used directly in the compounding of the rubber. While minor breaking-up of pellets in the drier may take place, it is intended that there be as little breaking up of pellets as possible.

It is preferable, but not necessary, to dry the pellets with a hot gas which is introduced at the lower end or relatively small cross-sectional end of the drier. When a hot gas is used as the drying medium, the pellets of relatively high liquid content and consequently of relatively large weight remain at the lower end of the column where the gas is hottest; while the pellets of less liquid content remain in the upper end of the column where the gas is the coolest. The temperature of the gaseous drying medium progressively decreases in its upward movement through the column because of the transfer of heat to the pellets and the evaporation of liquid therefrom. Thus, the temperature to which each pellet is subjected is progressively decreased as the liquid content thereof decreases, a feature which is particularly advantagous in preventing burning or other injury to the pellets, especially when latex is used as the wetting liquid.

It also may be advantageous in some cases to introduce excess gas or the suspension of droplets tangentially into the bottom of the agitating column, and to provide for the tangential removal of gas at the top of the column, preferably without abrupt change in the direction of flow. The tangential introduction and removal of gas causes the gas to whirl about the axis of the column, with a resulting effect similar to a centrifugal separator. In this manner, the newly formed carbon black droplets which are injected into the agitating column and suspended in the gas are prevented from passing completely through the column due to their initial momentum, since they are caught in the whirling movement of the gas and forced outwardly against the walls of the column by centrifugal force.

There are several features of the invention which make it particularly advantageous for producing carbon black pellets of superior quality. By passing excess carbon black through a fine spray of latex or other wetting liquid, the size of the carbon black-liquid particles and proportion of wetting liquid to carbon black can be accurately controlled. The use of an excess amount of carbon black also prevents the loss of wetting liquid by assuring that substantially all the wetting liquid will combine with carbon black. Any remaining carbon black is easily separated from the pellets in the agitating column and may be recycled. The conical or tapered agitating column with its varying gas velocities enables gravity separation of the pellets of the desired size, since the gas velocity may be easily adjusted at the bottom of the column by regulation of the gas flow to permit only those pellets of the desired size and density to leave the agitating column. Effective packing and formation of pellets is also achieved by the beating action of the rotating rods, or the like, inside the agitating column. It is of particular advantage in some cases to have countercurrent flow of the upward-moving newly-formed carbon black droplets contact the downward-moving densified pellets, since such action causes a more gradual and uniform increase in size of the pellets during their formation.

The latex which is preferred as the wetting agent serves as a binder for the carbon black, and may be produced under appropriate conditions by the combination of butadiene and styrene in the presence of water and a sodium salt of a fatty acid, as one example. Latexes of other rubbers, or natural latex may also be used as a binder in practicing this invention.

Conditions of operation, such as gas velocity, proportion of gas to carbon black, etc., can be readily determined by those skilled in the art by trial and error during the actual operation of the process, in the light of the present disclosure and discussion.

Figure 1 diagrammatically represents apparatus for one embodiment of the present invention for the pelleting of carbon black by using latex or other wetting liquid. In accordance with this invention, carbon black is produced in either a single or a series of furnaces 10 and conveyed as a suspension in a gaseous effluent through line 11 to "Cottrell" precipitator 12. Some of the carbon black is precipitated from the suspending medium as a fine flocculent powder having a density of about 3 pounds per cubic foot and passes out of the precipitator 12 through line 13 into a screw conveyer 14 which is powered by motor 16. That portion of the carbon black which is not precipitated from the effluent from the furnace 10 is passed to either a single or a series of cyclone separators 17. The remainder of the carbon black is recovered in separator 17 as a flocculent powder and also passes into screw conveyor 14 via line 18. The gas effluent, substantially free of carbon black, is vented through stack 19. Screw conveyer 14 passes the flocculent carbon black to a belt or bucket conveyor 21 which transports the carbon black to storage tank 22.

The carbon black, in the desired amount, is introduced by discharge means 23 into a gas being passed through line 24 and is passed to pelleting apparatus 26. In pelleting apparatus 26, the carbon black is mixed with a suitable liquid, such as a rubber latex, and is agitated to form pellets of the desired density and size. Excess gas and carbon black used in pelleting apparatus 26 are passed through line 27 to cyclone separator 28. In separator 28 carbon black is separated from the suspending medium and recycled to storage tank 22 by line 29. Gas is discharged from separator 28 through outlet or conduit 31. The wet pellets are withdrawn from pelleting apparatus 26 by line 32 and are introduced into the lower portion of dryer 33. The pellets are dried in drier 33 and removed therefrom by line 34 into separator 36. The pellets are recovered from the drying medium in separator 36 and are conveyed by line 37 and a belt or bucket conveyer 38 to storage tank 39. Element 42 is a blower and element 41 is a heater for the drying medium used in dryer 33. The fully formed and dried pellets have a density of about 20 to about 30 pounds per cubic foot, and the size of the pellets is about $\frac{1}{16}$ to about $\frac{3}{4}$ inch, preferably about $\frac{1}{16}$ to about $\frac{3}{8}$ inch, in diameter, depending more or less on the operating conditions.

Liquid to be admixed with the flocculent carbon black in the pelleting apparatus 26 is stored in tank 43. Pump 44 and line 46 are used to convey the liquid from tank 43 to pelleting apparatus 26.

In case of using latex as the wetting liquid, the carbon black pellets should not be heated much above about 250 to about 300° F. during the drying operation. The gas temperature to be used during drying will vary considerably, depending on the quantity of drying gas, upon how inert it is with respect to the carbon black or latex, if a latex is used, and upon its moisture content; generally the temperature of the drying gas is within a range of about 300 to about 550° F.

The pelleting apparatus 26 essentially comprises both a mixing apparatus for the carbon black and liquid and a conical or tapered agitator for forming the pellets. Dryer 33 is a similar conical column for the drying of wet pellets. Several embodiments of the pelleting apparatus will be described hereinafter in Figures 2 and 3.

Figure 2:
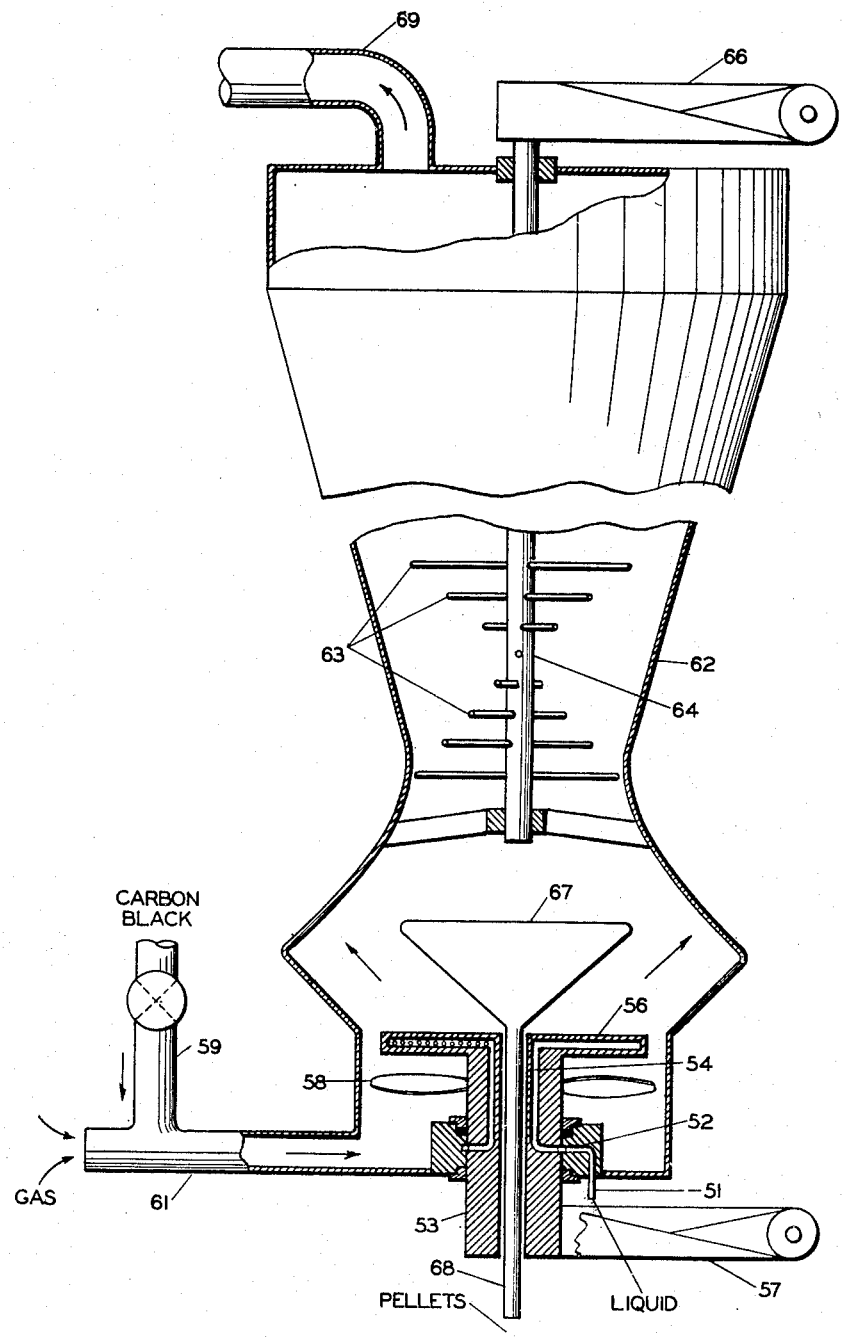

Figure 2 is a diagrammatic illustration of more specific details of a pelleting apparatus which may be used as element 26 in Figure 1. In the embodiment illustrated in Figure 2, the wetting liquid enters through the annular space 52 in shaft 53 by line 51 passing via a passageway 54 in revolving rods 56 and is injected (at right angles to incoming carbon black) through orifices or nozzles in revolving rods 56 attached to shaft 53. The orifices are spaced, preferably, on one side of the revolving rods 56 in such a manner that the liquid is ejected in the opposite direction to the rotation of rods 56. The rotating shaft 53, which is propelled by a belt 57 and motor (not shown) attached thereto, propels fan 58 and in so doing draws carbon black and a gas through lines 59 and 61 into the mixing zone. The incoming carbon black from line 59 passes through (at right angles) a fine spray of liquid which is in the form of a film or sheet of liquid to form small droplets of carbon black with wet nuclei. These small droplets are blown upward by the gas through the conical column 62 in which beaters 63 are rotating about shaft 64. The beaters 63 may comprise horizontal rods attached longitudinally and radially along the length of a shaft 64. Shaft 64 is rotated by a suitable means, such as a belt 66 and motor (not shown). These small droplets pass upward through the beaters 63 and through column 62 toward the top. By agitation and heating the small droplets combine and become larger and more dense and flow down the column until they are discharged through discharge means 67 and line 68 as wet finished pellets. The droplets or particles, as previously discussed, remain in the column due to the predetermined velocity of gases rising therethrough until they become pellets of the desired size and density when they fall out of the column. Gas and excess carbon black is withdrawn from the top of column 62 through conduit 69. It may be necessary to provide for further separation of the carbon black and gas; if so, the effluent from column 62 is passed via line 69 to a cyclone separator 28 of Figure 1 where an effective separation and recovery of carbon black is made. This carbon black may then be recycled to the process. The wet finished pellets of the desired size and density withdrawn through line 68 may pass, if desired, to a dryer such as dryer 24 of Figure 1 to be dried.

Figure 3:
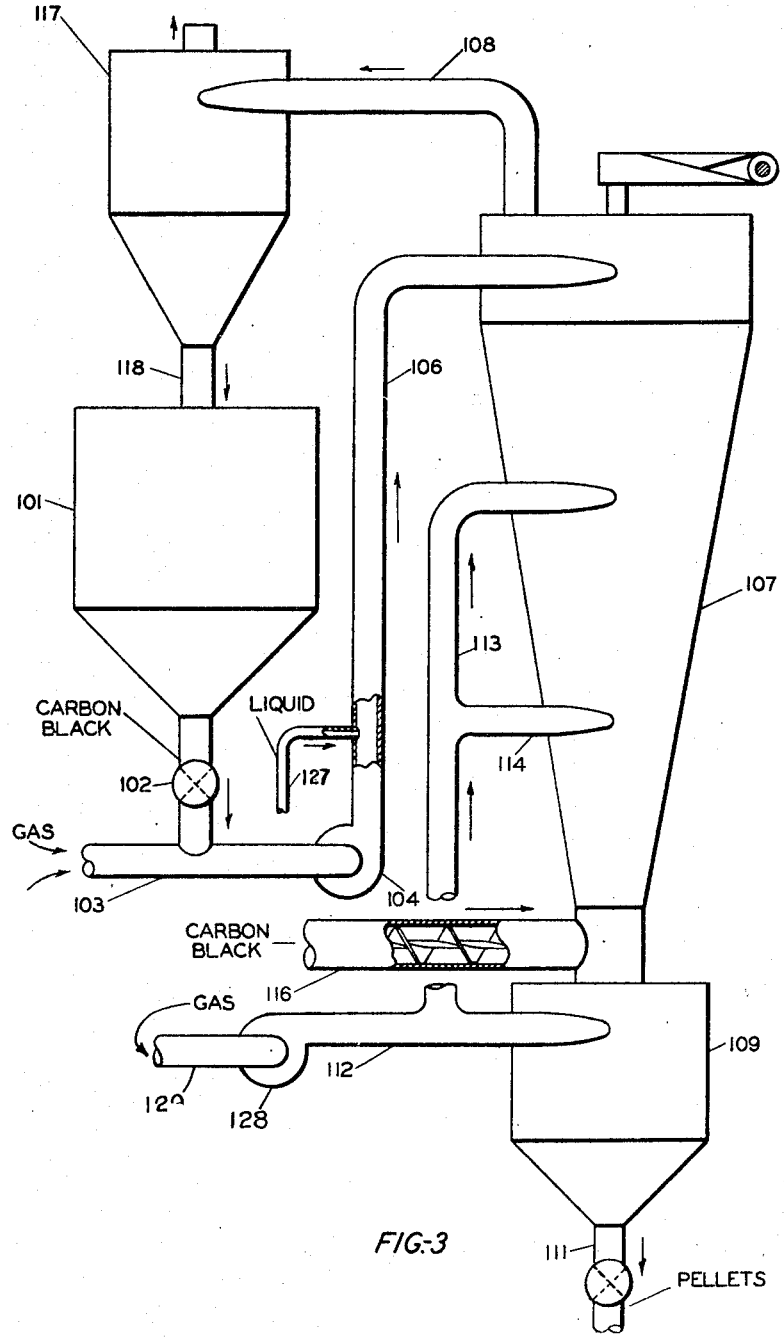

Figure 3 illustrates a specific embodiment of apparatus in which the newly formed wet droplets of carbon black are introduced into the top of an agitating column rather than the bottom of that column.

Carbon black from storage tank 101 is introduced into gas line 103 by discharge means 102 to form a suspension of carbon black in a gas. The suspension passes through blower 104 into line 106. A liquid, such as a rubber latex, is atomized into line 106 from line 127 to wet the carbon black suspension. The resulting suspension enters agitating column 107 tangentially to give a whirling motion to the suspension in column 107. A gas and unpelleted carbon black are removed from the top of column 107 by conduit 108. The suspension is agitated in column 107 by suitable means (not shown) and as pellets are formed by the agitation they fall down the column into accumulator 109. Wet pellets are removed from separator 109 and passed by line 111 to a suitable dryer (not shown), for treatment as hereinbefore discussed.

Sufficient gas is introduced into the agitating column 107 to suspend the pellets therein until they become within a desired size and density range, after which they fall into accumulator 109. Gas for this purpose tangentially enters accumulator 109 via line 112 and tangentially enters directly into column 107, if desired, through lines 113 and 114. Gas from a source, not shown, is passed by blower 128 into said line 112. The direction of the tangential entry of the gas into accumulator 109 and column 107 is similar to the entry of the suspension into column 107 through line 106 resulting in a whirling motion to the upward moving gas. However, it may be desirable in some cases to introduce the gas into column 107 without a tangential motion.

Additional carbon black may be introduced into column 107 by means of a screw conveyer 116. This additional carbon black flows upward through column 107 countercurrently to the downward flowing pellets and combines with any excess liquid on the pellets.

Gas and excess carbon black pass from column 107 by conduit 108 into a cyclone separator 117 where the excess carbon black is separated from the gas and sent to storage tank 101 through line 118.

If the gas is introduced tangentially through lines 113 and 114 into the column in the opposite direction to rotating rods or beaters, a swirling motion will be imparted to the stream of gas flowing upward through the column in the opposite direction to rotating rods which action results in a more effective beating and classification of the pellets.

The use of a mixing means, similar to that described in connection with Figure 2, is particularly advantageous, for by its use carbon black passes at right angles to a spray of liquid. By passing at right angles, the maximum contact can be made in the shortest possible time resulting in a far greater capacity than realizable by other methods. The ejection of the liquid from the rotating rods assures a spray or mist of liquid covering an entire area and forms a thin uniform film of liquid through which the carbon black passes.

Preferably the apparatus, including the mixer, agitating column, and the drier, should be positioned vertically on the same axis, one above the other. In this arrangement the pellets flow downward through the equipment by gravity through straight conduits which arrangement minimizes the chances of accumulation of materials and the consequent obstruction to the flow of the gases and pellets through any part of the equipment.

Based on the weight of the wet product produced by pelleting in accordance with this invention, the percentage of liquid in the wet product prior to drying is about 30 to about 60. In general, when using latex as the wetting agent the percentage is higher than when less viscous wetting agents are used. The rubber content of the latex may be within the range of about 15 per cent by weight to about 35 per cent by weight. The rubber content of the dry product produced by the process of this invention is within the range of about 5 per cent to about 20 per cent by weight, depending largely upon the concentration of the latex, the nature of the powdered material used, and the quantity of the latex employed.

As previously mentioned other flocculent powders, such as talc, zinc oxide, iron oxide, etc., may be pelleted in the manner described in this invention in combination with a suitable wetting liquid. These powders, including carbon black, will also form suitable pellets in the apparatus of this invention without the use of a wetting liquid. For example, carbon black forms pellets having a density of about 10 to about 20 pounds per cubic foot without the use of a wetting liquid and the pellets have a size within the range of about 8 to about 100 mesh, preferably about 8 to 40 mesh, depending upon the conditions of operation. When flocculent powder is pelleted without the aid of a wetting liquid the use of the drying column is dispensed with and the finished pellets are removed directly from the lower portion of the pelleting apparatus.

The carbon black pellets produced in the manner described heretofore are easily handled and packed. Their dustless quality prevents them from being a constant annoyance and reduces any health hazard accompanying their tendency to form finely divided dust particles which remain suspended in the air. The regularity in size of the pellets and the comparative ease with which they may be incorporated into rubber make the product an ideal filler in compounding of rubber products. Furthermore, the carbon black has the optimum chemical properties as a filler without alteration due to the pelleting process.

Several embodiments of the invention have been shown, but obviously others will occur to those skilled in the art which will be within the scope of the present invention.

We claim:

1. The method of pelleting a flocculent powder which comprises forming a suspension of said powder in a gas, introducing an atomized wetting liquid in an amount sufficient to form pellets with said powder but insufficient to convert said powder into a slurry into said suspension to wet at least a portion of suspended powder, passing the resulting suspension mixture into the lower portion of a vertical agitating column, mechanically agitating said resulting suspension mixture to form pellets comprising an admixture of said flocculent powder and said wetting liquid in said column suspended in said gas, decreasing the velocity of said suspension mixture as it passes through said column under conditions such that upon the formation of pellets of the desired size and density said pellets fall countercurrently to the upward flow of said resulting suspension mixture in said column, passing gas and unpelleted powder from the upper portion of said column, discharging pellets of the desired size and density still suspended in said gas from the lower portion of said column, passing said pellets still suspended in said gas to the lower portion of a vertical drying column, introducing a gas into the lower portion of said drying column to suspend said pellets therein, decreasing the velocity of flow of said suspending gas passing upward through said column such that the decrease in weight of pellets due to drying is partially compensated for by the decrease in the velocity of the suspending gas in such a manner that pellets still suspended in said gas are retained in said drying column until substantially dry, removing gas and dry pellets still suspended in said gas from the upper portion of said column, and separating said gas and said dried pellets, the continuous suspension of pellets in said gas from the time of their formation until their removal from the drying column maintaining said pellets generally out of prolonged contact with the walls and bottom of said columns whereby the formation of a slurry or massive deposit thereon is avoided.

2. The method of pelleting flocculent powder which comprises forming a suspension of said powder in a gas, introducing an atomized wetting liquid in an amount sufficient to form pellets with said powder but insufficient to convert said powder into a slurry into said suspension to wet at least a portion of suspended powder, passing a resulting suspension mixture into the lower portion of a vertical agitating column, mechanically agitating said resulting suspension mixture to form pellets comprising an admixture of said flocculent powder and said wetting liquid in said column, decreasing the velocity of said suspension mixture as it passes through said column under conditions such that upon the formation of pellets of the desired size and density said pellets fall countercurrently to the upward flow of said resulting suspension mixture in said column, passing gas and unpelleted powder from the upper portion of said column, and discharging pellets of the desired size and density from the lower portions of said column.

3. The method of claim 2 in which said flocculent powder is carbon black.

4. The method of claim 2 in which said flocculent powder is carbon black and said wetting liquid is a rubber latex.

5. The method of drying wet carbon black pellets which comprises passing said wet pellets to the lower portion of a vertical drying column, introducing a preheated drying gas into the lower portion of said drying column to suspend said wet pellets therein, decreasing the velocity of flow of said suspending gas passing upward through said column such that the decrease in weight due to drying is partially compensated for by the decrease in the velocity of the suspending gas in such manner that the pellets are retained suspended in said gas in said column until substantially dry, removing gas and substantially dry carbon black pellets from the upper portion of said column, and separating said gas and said carbon black pellets.

6. In the compounding of a rubber wherein carbon black pellets are admixed with a crude rubber to form a homogeneous mixture therewith, the improvement which comprises forming a suspension mixture of flocculent carbon black powder and a wetting liquid latex in an amount sufficient to form pellets with said powder but insufficient to convert said powder into a slurry in a gas, passing said suspension mixture into the upper portion of a vertical column, introducing a gas into the lower portion of said column, decreasing the velocity of said gas as it passes through said column under conditions such that gas flows upward through said column and said suspended carbon black and wetting liquid flows downward through said column, agitating the countercurrently flowing streams of gas and suspended material in said column, forming pellets of said carbon black suspended in said gas, withdrawing gas and unpelleted carbon black from the upper portion of said column, and discharging carbon black pellets suspended in said gas of the desired size and density from the lower portion of said column.

7. The method of pelleting flocculent carbon black which comprises forming a suspension mixture of said flocculent carbon black and a wetting liquid in an amount sufficient to form pellets with said flocculent carbon black but insufficient to convert said flocculent carbon black into a slurry in a gas, tangentially introducing said suspension mixture into the upper portion of a vertical column, tangentially introducing a gas into the lower portion of said column in a similar manner to the tangential entry of the suspension mixture in the upper portion of said column, decreasing the velocity of said gas as it passes upwardly through said column, introducing flocculent carbon black in excess of that necessary to form pellets into the lower portion of said column so that an observable quantity of unpelleted black will emerge from the upper portion of said column, agitating a suspended mixture in said column, forming pellets of carbon black suspended in said gas, withdrawing gas and unpelleted carbon black from the upper portion of said column, and discharging carbon black pellets suspended in said gas having the desired size and density from the lower portion of said column.

8. The method of pelleting flocculent powder which comprises forming a suspension mixture of said powder and a wetting liquid in a gas, said liquid being added in an amount sufficient to form pellets with said powder but insufficient to convert said powder into a slurry, passing said suspension mixture into the lower portion of a vertical tower, decreasing the velocity of said suspension mixture as it passes through said tower, agitating said suspension mixture in said tower, forming pellets of said powder suspended in said gas, withdrawing pellets suspended in said gas of the desired size and density from the lower portion of said tower, and passing gas and unpelleted powder out the upper portion of said tower.

9. The method of pelleting flocculent powder which comprises forming a suspension mixture of said powder in a gas, passing said suspension mixture into the lower portion of a vertical tower, decreasing the velocity of said suspension mixture as it passes through said tower, agitating said suspension mixture in said tower, forming pellets of said powder suspended in said gas, withdrawing pellets suspended in said gas of the desired size and density from the lower portion of said tower, and passing gas and unpelleted powder out the upper portion of said tower.

10. The method of pelleting flocculent powder which comprises forming a suspension mixture comprising said flocculent powder and a wetting liquid in a gas, said liquid being added in an amount sufficient to form pellets with said powder but insufficient to convert said powder into a slurry, introducing said suspension into a vertical column, creating a flow of gas upward through said column, decreasing the velocity of said gas as it flows through said column, agitating a suspension mixture in said column, forming pellets of said powder suspended in said gas, passing gas and unpelleted powder from the upper portion of said column, and discharging pellets suspended in said gas of said powder having the desired size and density from the lower portion of said column.

11. The method of pelleting flocculent powder which comprises forming a suspension mixture comprising said flocculent powder in a gas, introducing said suspension into a vertical column, creating a flow of gas upward through said column decreasing the velocity of said gas as it flows through said column, agitating a suspension mixture in said column, forming pellets of said powder suspended in said gas, passing gas and unpelleted powder from the upper portion of said column, and discharging pellets suspended in said gas of said powder having the desired size and density from the lower portion of said column.

12. Apparatus for drying wet carbon black pellets which comprises in combination a vertical column having a decreasing cross sectional area from top to bottom, said column having a gas inlet in the lower portion thereof and a gas and dry pellet outlet in the upper portion thereof, means for creating a moving stream of gas, a conduit communicating between said means and said gas inlet, means for introducing said wet carbon black pellets into the lower portion of said column, means for separating dried pellets and gas, and a conduit communicating between said separating means and said gas and dry pellet outlet.

References Cited in the file of this patent

UNITED STATES PATENTS

| Number | Name | Date |
| --- | --- | --- |
| 798,880 | Cramer | Sept. 5, 1905 |
| 853,517 | Osborne | May 14, 1907 |
| 1,355,105 | Canon | Oct. 5, 1920 |
| 1,984,380 | Odell | Dec. 18, 1934 |
| 2,054,441 | Peebles | Sept. 15, 1936 |
| 2,185,158 | Price | Dec. 26, 1939 |
| 2,221,175 | Bechtold | Nov. 12, 1940 |
| 2,293,113 | Carney | Aug. 18, 1942 |
| 2,306,698 | Heller | Dec. 29, 1942 |
| 2,316,207 | Winter | Apr. 13, 1943 |
| 2,327,016 | Carney | Aug. 17, 1943 |
| 2,332,057 | Carney | Oct. 19, 1943 |
| 2,457,962 | Whaley | Jan. 4, 1949 |
| 2,457,963 | Thodos | Jan. 4, 1949 |

OTHER REFERENCES

Bulletin No. 4–1937 entitled "Venturi Washer, Scrubber, Concentrator and Absorber," Bowen Research Corp., Garwood, N. J., 4 pages.